Figure 1:
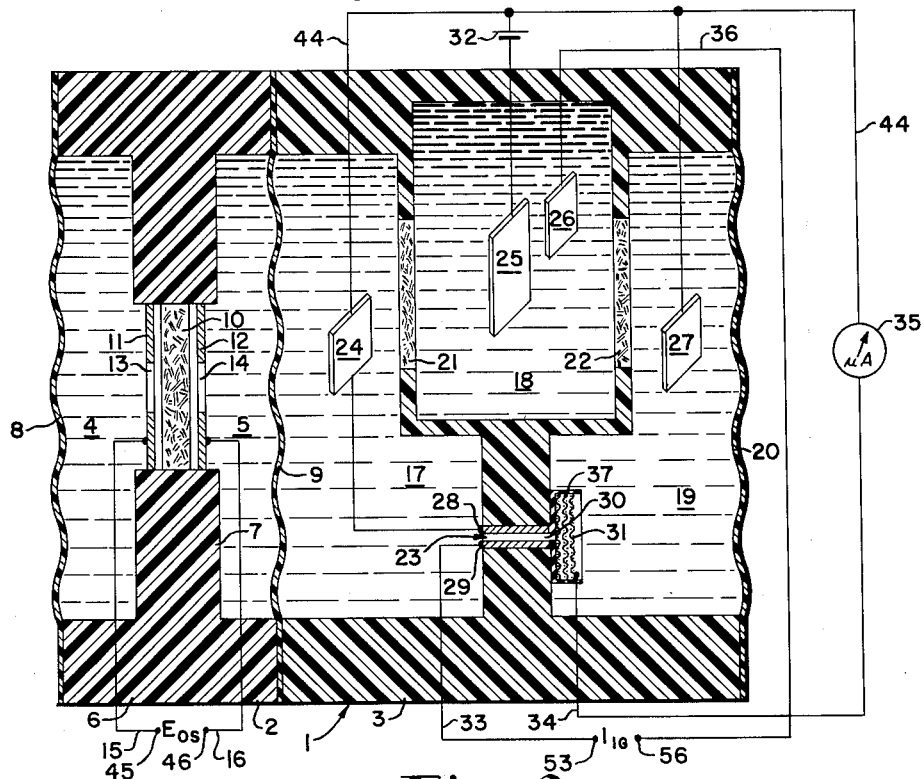

Aug. 21, 1962  R. M. HURD  3,050,665
ELECTROLYTIC PRODUCT CELL
Filed July 13, 1955

INVENTOR
R. M. HURD

BY

ATTORNEYS

United States Patent Office 3,050,665
Patented Aug. 21, 1962

3,050,665
ELECTROLYTIC PRODUCT CELL
Ray M. Hurd, Austin, Tex., assignor, by mesne assignments, to the United States of America as represented by the Secretary of the Navy
Filed July 13, 1955, Ser. No. 521,936
7 Claims. (Cl. 317—231)

This invention relates to a device for providing a multiplication of electrical currents from two inputs thereto and for providing an output which is proportional to the product of the two input currents. More specifically, the invention relates to a new combination of the structure of an electrolytic detecting device and an electro-osmotic cell.

It is a feature of this invention to provide a product cell with very low power consumption for providing an output which is proportional to the product of two input currents.

Prior devices for the purpose for which the instant invention is intended have been found hard to construct and in general are not well adapted for use in mine mechanisms due to the forces to which the assembly is subjected in mine laying.

The assembly in general comprises two units, the first of which is an electro-osmotic driver, the general character of which is known in the art. The second unit comprises a special electrolytic product detecting cell. This detecting cell is a three chamber assembly and one of the chambers is adapted to contain a concentrated iodine solution while the other two chambers are arranged to contain a dilute iodine solution. The chambers containing the dilute iodine solution are each closed on the outer side thereof by a diaphragm while the third chamber is enclosed by the wall defining the first two chambers. The three chambers are so constructed as to be in mutual fluid communication, i.e., the first and third chambers and the second and third chambers are in fluid communication each through a porous ceramic partition section disposed in the wall common to the respective chambers, while the first and second chambers are in fluid communication through a small corridor or passage therebetween hereinafter to be described in greater detail.

In general the function of the overall system is to provide external biasing circuitry and circuitry internal of the two cell units which includes a system of electrodes in the electro-osmotic cell for accomplishing a fluid driving action for the detector cell, and a second system of electrodes including elements in each of the chambers of the detector cell for a purpose which will become apparent as the description proceeds. A first direct current potential is applied across the electrodes in each of two substantially separated chambers of the electro-osmotic cell which causes a fluid flow through a system of capillary tubes in a porous glass or ceramic filter disposed between two chambers thereof. This fluid flow provides movement of a common diaphragm disposed between the second chamber of the electro-osmotic cell and the first chamber of the product cell unit. This action by the electro-osmotic driver unit produces actuation of the detector, and induces a fluid flow through the aforementioned corridor or passage to distend the diaphragm closing the second chamber. When a second current is caused to flow in the external circuit of the detector and through a certain pair of the electrodes in the detector cell an output current may be obtained from the detector cell which is proportional to the product of the current flowing in the second circuit and of the flow produced by the electro-osmotic cell, thereby providing an output which represents the product of the two input currents. The manner in which the detector cell is responsive to movement of the electrolyte in the chamber thereof to provide current flow in response to said movement will become more clearly apparent as the description proceeds.

It is an object of the invention to provide a device for multiplying a current flowing in a first circuit by a current flowing in a second circuit and providing means for deriving an output therefrom which is proportional to the product of the two input currents.

In correlation with the immediately foregoing object it is a further object to provide an electro-osmotic driver cell and an electrolytic detector cell providing the foregoing functions with very low consumption of power whereby the device may advantageously be operated by batteries and remain operative throughout substantially the entire shelf life of the batteries.

Another object of the invention is to provide a product cell which is relatively insensitive to shock and/or damage during handling or in service use such as in an aircraft laid ground mine.

It is also an object of the instant invention to provide a system for providing a multiplication of two input currents applied thereto and obtaining a product output which system is of a character providing simplified construction without sacrifice of ruggedness or reliability over the apparatus heretofore or now in general use for mine mechanisms, and which system further comprises hydro-acoustic elements which are inherently more resistant to mechanical influences of shock and the like than electronic devices heretofore used to obtain a product output.

Figure 2:
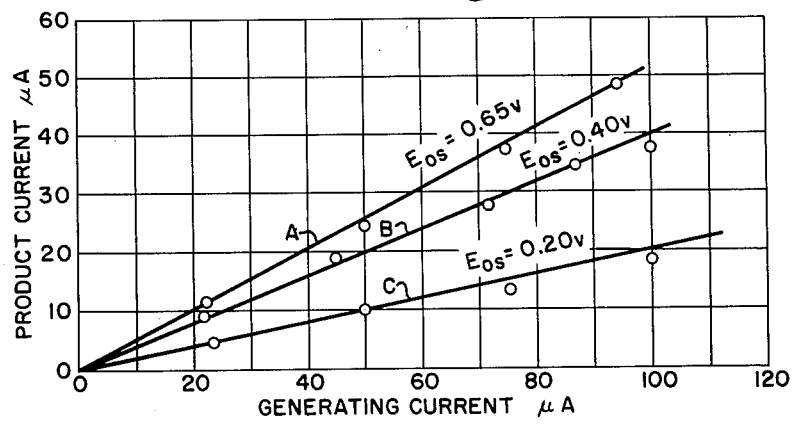

Other objects and many attendant advantages of this invention will be readily appreciated as the same becomes better understood by reference to the following detailed description when considered in connection with the accompanying drawings wherein:

FIG. 1 is a diagrammatic illustration in vertical section of an electrolytic product cell device of the instant invention comprising an electro-osmotic driver cell and an electrolytic product detector cell; and FIG. 2 is a graphical illustration showing the product current output of the product cell as compared to the two input generating currents.

Referring now to FIG. 1 of the drawing the product cell device indicated generally at 1 of the instant invention is shown to comprise an electro-osmotic driver cell 2 and a product detector cell 3. The electro-osmotic cell is of a character somewhat similar to the electro-kinetic device shown and described in U.S. Patent 2,661,430 issued to E. V. Hardway, Jr., on December 1, 1953. The general differences between a streaming potential device to which the aforementioned patent is primarily directed and an electro-osmotic device is pointed out therein and further particular differences of the instant electro-osmotic cell from that discussed in the aforenamed patent will become apparent as the description proceeds. One particular distinction therebetween which must be emphasized lies in the necessity for usage of depolarizing electrodes in an electro-osmotic cell.

The electro-osmotic cell is advantageously combined with the product cell in the instant arrangement in a manner whereby the detector cell is arranged to be driven by the electro-osmotic cell for a purpose as will hereinafter become apparent.

The electro-osmotic cell 2 comprises two closed chambers 4 and 5 provided by the housing portion 6 which has a centrally disposed wall portion 7 to provide a partial separation of the two chambers 4 and 5. The generally cylindrical casing 6 is closed at the ends by a pair of diaphragms 8 and 9. The diaphragm 9 is common to both the electro-osmotic cell 2 and the detector cell 3.

Disposed in an opening provided by the partition portion 7 is a disc shaped porous ceramic filter 10 of suitable porosity. Disposed in adjacency thereto and on opposite sides of the filter disc 10 there are a pair of electrode elements 11 and 12. The electrodes may be of a screen mesh character, or alternately, and as shown are provided with orifices respectively at 13 and 14 for passage of the fluid contained in the two chambers 4 and 5 therethrough and through the filter 10 with application of a unidirectional current potential of proper polarity across the electrodes 11 and 12. The leads 15 and 16 are brought out through the casing 6 respectively from the electrodes 11 and 12 for connection to an external circuit for applying an input current thereto.

The general purpose of the electro-osmotic cell is to provide a flow or movement of the fluid from chamber 4 to chamber 5 with application of a potential across the electrodes thereof at the terminals 45 and 46 of their respective leads 15 and 16. Movement of the fluid provides movement of the diaphragm 9 and will thereby produce movement of the electrolyte fluids in the chambers 17, 18 and 19 of the detector cell.

The electro-osmotic cell chambers 4 and 5 are completely filled with a fluid suitable for the purpose such for example as distilled water, acetonitrile, or acetone.

Referring now to the portion of the structure of the detector cell indicated generally by reference character 3 there is provided a plurality of partition arrangements which are of integral construction with the casing 3 and divide the interior into three chambers for reception of an electrolyte solution of iodine. The chambers are indicated generally at 17, 18 and 19. The chamber 17 is closed by the diaphragm 9 which is common to the electro-osmotic cell. The chambers 17, 18 and 18, 19 are in mutual fluid communication as provided by the pair of porous ceramic filter discs 21 and 22 disposed respectively between chambers 17 and 18, and 18 and 19. The flow passage 23 is disposed in the wall portion of the casing 3 providing the separation between chambers 17 and 19. The chamber 19 is closed by the diaphragm 20. The electrolytic detector casing 3 is constructed of a plastic material suitable for the purpose, such as polymonochlorotrifluoroethylene and available commercially under the trade name Kel-F, plastic product of the W. Kellogg Company of Jersey City, New Jersey. It is of such configuration as to provide the chambers and openings therein for reception of the ceramic discs 21 and 22, and additionally to provide a passage or corridor assembly indicated generally at 23.

The corridor 23 is adapted to receive a pair of closely spaced parallel upper and lower platinum electrodes 28 and 29. The sidewalls of the passage at 30 are of the Kel-F plastic. A pair of plate electrodes 24 and 27 are connected to the positive terminal of battery 32 and disposed respectively in each of the chambers 17 and 19. Two platinum plate type electrodes 25 and 26 are disposed in chamber 18, the electrode 25 being connected to the negative terminal of the 0.9 volt bias battery 32. A platinum gauze electrode 31 is disposed in the Kel-F shell 37 in chamber 19 directly in front of the corridor 23. The diaphragms 9 and 20 are also of Kel-F and are sealed to the body after filling with iodine-iodide electrolyte solution as by the application of heat at the joint thereof.

The plate electrodes 24 and 27 respectively in chambers 17 and 19 are biased at 0.9 volt negative with respect to one of the plate electrodes in chamber 3 by the battery generally indicated at 32 and by circuit connection substantially as shown in FIG. 1 of the drawing. The battery advantageously may be of the character shown in U.S. Patents 2,697,736 and 2,697,737 to Monroe B. Goldberg et al., issued on December 21, 1954.

Under these bias conditions for operation, the iodine molecules hereinafter designated $I_2°$ will be consumed in chambers 17 and 19 and be deposited in chamber 18 by an electro-chemical process. After a sufficiently long period of time such for example as approximately 24 hours, nearly all of the $I_2°$ will have been transferred into chamber 18 so that the solutions in chambers 17 and 19 will be very dilute in iodine, while still retaining substantially the same iodide concentration. Thus it will be apparent that the bottom electrode in the small corridor is made the anode with respect to the cathode 25 in chamber 18 current can flow easily in this circuit with no appreciable polarization, and in so doing will generate $I_2°$ from $I^-$ inside the corridor 23, the rate of generation also be exactly proportional to the current flowing.

If fluid is not flowing through the corridor 23, almost all of the iodine will diffuse across to the top electrode 28 and will be electro-chemically reduced to $I^-$ again if the electrode 28 is charged as a cathode. However, if the fluid is flowing through the corridor, some of the $I_2°$ will be carried to the platinum gauze electrode 31 and reduced to $I^-$ there. The amount of iodine reaching the gauze electrode i.e. the current in this circuit, will be proportional to the product of the rate of iodine generation and the rate of fluid flow. If one input current drives the electro-osmotic cell by application of a potential across the terminals 45 and 46 as indicated by $E_{OS}$ which is supplied to the leads 15 and 16 respectively for electrodes 11 and 12, and the second iodide generating input current indicated $I_{IG}$ as applied at terminals 53 and 56 and through leads 33 and 36 generates the iodide, then the current flow in leads 34 and 44 as picked up by the gauze electrode 31 and indicated by the micro ammeter 35 will be proportional to the product of the two input currents.

The product current obtained with varying generating currents E osmotic potentials as shown in microamperes in the three linear product curves of FIG. 2 will bear out the operation of the instant device. The linear curves A, B and C are shown respectively for values of $E_{OS}$ voltage across the osmotic cell of 0.65 volt, 0.40 volt and 0.20 volt. A product current indicating device is shown as a microammeter or the like at 35, but it is to be understood that other utilizing devices may be substituted therefor whereby the product may be applied to circuitry for actuating the firing circuits of a mine or other uses as will be apparent to those skilled in the art.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In an electrokinetic device, the combination of a casing, an electro-osmotic cell contained by a first portion of said casing, a pair of diaphragms enclosing the electro-osmotic cell, a linear detector cell in said casing, one of said diaphragms of said electro-osmotic cell being common to said electrolytic product cell for providing driving action thereof, said electro-osmotic cell further including an inert filter wall of ultra fine porosity and having a mutually spaced pair of electrodes in adjacency to said filter, means for applying electrical energy to said electrodes, a closure diaphragm for said detector cell, an electrolytic solution of iodine for providing iodine ions in said detector cell, means in said detector cell including a hydraulic resistance for providing an ion flow proportional to the driving force applied thereto by said common diaphragm, means within the detector cell for generating iodine molecules at a rate proportional to a second input current applied thereto, and means for providing an output signal which is proportional to the product of the voltage energizing said electro-osmotic cell and said second input current.

2. The device of claim 1 further characterized by the inclusion of means connected into the circuit of said product deriving means for applying thereto a biasing potential to effect a physical separation of $I^-$ ions and $I_2°$ molecules in closely spaced adjacency to said iodine molecules generating means.

3. An electrolytic product cell device comprising an electro-osmotic cell of a character for providing a fluid flow in response to a first input current flow therethrough, and an electrolytic linear detector cell disposed in coupled arrangement for driven action from said electro-osmotic cell to provide a fluid flow therein, said electrolytic linear detector cell comprising means for generating $I_2°$ molecules, means for electrically energizing the electrolytic product cell, a plurality of chambers in said linear detector cell containing a solution of iodine and iodide, means including a source of potential for concentrating the $I_2$ molecules in one of the chambers of said device and generally remote from the iodine-ion solution but in fluid communication therewith, said last named means comprising a plurality of inert inorganic wall portions in said chambers providing a plurality of capillary tubes therethrough, and means in said detector cell responsive to application of a physical flow of fluid therethrough in response to driving action of the electro-osmotic cell for providing an output from the detector cell proportional to the product of said fluid flow and the physical flow of $I_2°$ molecules in the solution in the iodine-ion generating portion of the detector cell.

4. The combination of an electro-osmotic cell of the character described comprising a housing, means providing a pair of fluid chambers in said housing, said pair of chambers containing a common fluid therein, a pair of diaphragms for closing said casing, a partition wall therein carrying a filter disc providing a plurality of capillary tubes and of a material inert to the fluid therein, said plurality of capillary tubes providing fluid communication between said chambers, a pair of electrodes disposed on opposite surfaces of said capillary means, an external circuit for energizing said electrodes and providing a current flow through said electro-osmotic cell, and a linear electrolytic detector coupled to the electro-osmotic cell in a manner to be driven thereby, said electrolytic detector being arranged for coupled mounting in said housing in immediate adjacency to said electro-osmotic cell in such a manner that electrolytic fluid contained therein is subject to driving action by the electro-osmotic cell, circuit means for providing an input current flow to said electrolytic detector cell, means in said detecting cell for providing generation of iodine-ions in response to said current flow and movement of said electrolyte fluid, a plurality of chambers in said electrolytic linear detector containing a solution of iodine and iodide, circuit means including a battery source of bias for concentrating the $I_2$ molecules in one of said chambers of said device and remote from the iodine $I_0^-$ ion solution but in communication therewith, means providing fluid communication between said concentrating chambers and the other of said pluralities of chambers, and means in said detector responsive to application of a pressure to the electrolyte therein for providing a flow of ions which is proportional to the current flow in the electrolytic detector as produced by driving action of said electro-osmotic cell for multiplying the two input currents to obtain a product output.

5. In combination, an electro-osmotic cell and a linear electrolytic detector cell, said detecting cell being adapted to be driven directly by the electro-osmotic cell, circuit means for energizing the electro-osmotic cell, means for energizing said detecting cell, means in said linear detector cell for providing generation of iodine-ions, a plurality of chambers in said linear detector containing solutions of iodine-ions and iodide molecules, circuit means including a source of potential for concentrating the iodide molecules in a first chamber of said device generally remote from the iodine-ion solution in the other of said plurality of chambers, means providing restricted fluid communication mutually between said chambers, means in said detector cell responsive to application of a current by said energizing means therefor, and simultaneous with application of a second current to said electro-osmotic cell from its energizing means to provide fluid flow of said electrolyte solution through said ion generating means commensurate with the driving force applied thereto, and means for providing an output from the detector cell proportional to the product of the current flow in the electro-osmotic cell as represented by the electrolyte fluid flow, and the second current input to the detector cell.

6. The combination of an electro-osmotic cell and a linear electrolytic detecting cell in which the detecting cell is adapted to be driven directly by the electro-osmotic cell, circuit means for energizing the electro-osmotic cell, means in said linear detecting cell for providing generation of $I_0^-$ iodine-ions, a plurality of chambers in said linear detector containing solutions of iodine and iodide, circuit means including a source of potential for concentrating $I_2$ molecules in a chamber of said device generally remote from the $I_0^-$ iodine-ion solution concentration but in fluid communication therewith, and means in said detector which is responsive to application of a physical flow of fluid therethrough in response to driven action by the electro-osmotic cell for providing an output proportional to the product of the current flow in the electro-osmotic cell and the iodine-ions generated with fluid flow in the detector cell.

7. In a product cell device of the character disclosed, the combination of an electrolytic cell, an electro-osmotic driving cell operatively coupled to said electrolytic cell for causing a fluid flow therein variably in response to the value of an electrical voltage applied to the driving cell, means including an electrolytic element disposed in said electrolytic cell for producing iodine molecules in response to an input electrical current applied thereto, and a porous negatively biased electrolytic detection electrode arranged within the electrolytic cell in the flow of said fluid, said detection electrode being of a character providing an electrical output current proportional to the product of the rate of flow of said fluid therethrough and the rate of generation of said molecules.

References Cited in the file of this patent
UNITED STATES PATENTS

| | | |
|---|---|---|
| 2,661,430 | Hardway | Dec. 1, 1953 |
| 2,685,025 | Root | July 27, 1954 |